(12) United States Patent
Huang

(10) Patent No.: US 11,365,053 B2
(45) Date of Patent: Jun. 21, 2022

(54) DYNAMIC STORAGE DEVICE AND DYNAMIC ACCESS MANAGEMENT METHOD

(71) Applicant: Kuo-Cheng Huang, Taichung (TW)

(72) Inventor: Kuo-Cheng Huang, Taichung (TW)

( * ) Notice: Subject to any disclaimer, the term of this patent is extended or adjusted under 35 U.S.C. 154(b) by 0 days.

(21) Appl. No.: 16/608,845

(22) PCT Filed: Oct. 25, 2018

(86) PCT No.: PCT/CN2018/111777
§ 371 (c)(1),
(2) Date: Oct. 27, 2019

(87) PCT Pub. No.: WO2020/082281
PCT Pub. Date: Apr. 30, 2020

(65) Prior Publication Data
US 2021/0331868 A1     Oct. 28, 2021

(51) Int. Cl.
*G06F 7/00*         (2006.01)
*B65G 1/137*        (2006.01)
*G06K 7/10*         (2006.01)
*B65G 13/02*        (2006.01)

(52) U.S. Cl.
CPC ....... *B65G 1/1371* (2013.01); *G06K 7/10366* (2013.01); *B65G 13/02* (2013.01)

(58) Field of Classification Search
USPC ......................................... 700/213–216, 228
See application file for complete search history.

(56) References Cited

U.S. PATENT DOCUMENTS

2017/0174436 A1*   6/2017  Aalund ..................... B07C 5/04

FOREIGN PATENT DOCUMENTS

| CN | 204587849 U   | 8/2015 |
| CN | 108016800 A   | 5/2018 |
| TW | M567422 U     | 9/2018 |
| WO | 2018175910 A1 | 9/2018 |

* cited by examiner

*Primary Examiner* — Yolanda R Cumbess
(74) *Attorney, Agent, or Firm* — Pai Patent & Trademark Law Firm; Chao-Chang David Pai

(57) ABSTRACT

A dynamic storage device includes a storage area, a power carrying and moving device, a carrier group, a carrier detection device, a power transmission device, a gate, a gate detection device, a temporary storage area and a temporary storage area detection device. The storage device further includes a central control system for commanding, controlling, instructing and managing the aforementioned components and managing the information returned from each component. A Radio Frequency Identification (RFID) technology is used to implement the dynamic storage device and the dynamic access management method. The RFID tag is labelled to the carrier instead of the object, and the targets managed by the storage device and dynamic access management method are the carrier and carrier group. Each carrier forming the carrier group records the detailed object information contained in the carrier by the RFID tag, so as to achieve the effects of managing the object.

10 Claims, 14 Drawing Sheets

DYNAMIC STORAGE DEVICE AND DYNAMIC ACCESS MANAGEMENT METHOD

FIELD OF INVENTION

The present invention relates to a Radio Frequency IDentification (RFID) technology used for dynamically storing and managing objects.

BACKGROUND OF INVENTION

In general, an object access management method includes the management of collecting, retrieving and storing an object. The present object access management method is described briefly below:

In the technology of two-dimensional codes (such as barcodes or QR codes), a two-dimensional code contains information related to the object (such as the information including but not limited to object number, producer data, object specification, production time, transfer or delivery time, quantity, unit price, total price, tax amount, etc.) In the procedure of collecting an object, a barcode scanner is used to read the information contents of the two-dimensional code of the object one by one, and the information contents are sent and stored into the management system. After obtaining the information contents, the management system determines and assigns a category to the object and specifies a storage area and a storage location of the object in a physical storage device according to the category. The storage areas of the physical storage device are also allocated according to the category. A storage device manager transports each object to its own storage area and storage location according to the specification of a management system and finds and retrieves each specific object from its storage area and storage location as specified by the management system.

The aforementioned conventional storage device and object access management method have the following drawbacks:

1. Each object is assigned with a two-dimensional code, and the two-dimensional code in form of a label (or a sticker) is attached onto a surface of the object or its package or carrier, and thus the conventional method and device have the drawbacks of requiring lots of labor, causing errors easily, and having physical unmatched with the content of the two-dimensional code frequently. In addition, the label of the two-dimensional code may fall off easily. As a result, the object cannot be accessed or managed. In addition, the original label may be peeled off, changed, or tampered easily.

2. When the object is collected, it is necessary to scan the two-dimensional codes of the objects one by one. This also requires a lot of man-hours, and the scan of some objects may be missed, and thus the actual collected object may be inconsistent with the data registered in the management system.

3. Although the storage device management system has specified the storage area and storage location of the object, it cannot absolutely avoid the issue of storing the object into a wrong storage location by a storage device manager (or a natural person). If the number of physical storage devices is huge, the traffic flow is complicated, and the object is stored into a wrong storage location, then it will be difficult to find the object, and thus the statistics of the object will be inconsistent with the data registered in the management system.

4. The storage area and storage location of the physical storage device are also allocated according to category. When less or more objects of a certain category are collected or retrieved, the storage area for such category will have too many storage areas left, but the extra storage areas cannot be used for the storage of objects of other categories, or when more objects of a certain category are accessed, and the storage area is insufficient for the use, the objects overflown from the storage area will have no appropriate storage area for their storage. Obviously, such storage device management system cannot use the storage area of the physical storage device effectively. Although the storage area can be used flexibly by programming the storage area in the management system, yet repeated changes of the storage area of the management system may cause possible confusions of the management.

5. To facilitate collecting and retrieving an object, it is necessary to reserve a passage between the storage areas or storage locations of the physical storage device to allow the storage device manager or transportation device to pass through, and such arrangement may easily cause chaos of traffic flow during the collection and retrieval of the object and may reduce the usable area of the storage area.

The Radio Frequency IDentification (RFID) technology replacing the two-dimensional code for the management of the storage device can overcome the aforementioned first and second issues, but if the categorization and storage of the object and the way of retrieving the object are still the same as described above, then the aforementioned third, fourth and fifth issues still cannot be solved.

SUMMARY OF THE INVENTION

To overcome the aforementioned issues, this invention provides a dynamic storage device and a dynamic access management method.

The dynamic storage device comprises:

a central control system;

at least one storage area having a plurality of power carrying and moving devices, the central control system controlling the direction and predetermined stop positions for each power carrying and moving device;

each power carrying and moving device comprising a predetermined number of storage locations within the storage area, wherein the central control system dynamically assigns a carrier group to one of the storage locations, wherein each storage location is recorded by the central control system;

the carrier group is formed by stacking a predetermined number of carriers, each carrier carrying at least one object, and each carrier comprising a Radio Frequency Identification (RFID) tag attached thereto, the RFID tag having tag information that can be written and read repeatedly, and wherein the tag information records object data of the carrier;

a carrier detection device, installed in the storage area, configured to detect whether or not the storage locations have a carrier group, the carrier detection device sends a detection result of each storage location to the central control system, and the carrier detection device reads and sends tag information of each carrier read by the carrier group to the central control system;

the central control system recording the tag information of each carrier in the carrier group and associates the tag information with the storage locations;

a power transmission device configured to communicate with the power carrying and moving device; the power transmission device being controlled by the central control system to move and to stop;

wherein the power transmission device, and the power carrying and moving device control the carrier group to enter into or move out of a storage location that has been specified by the central control system;

at least one gate configured to communicate with the power transmission device;

the at least one gate moves a carrier group disposed at the gate out of the storage area, or into the storage area;

the at least one gate comprising a gate detection device, wherein the gate detection device detects for each gate, whether or not a carrier group is present, the quantity of carriers contained in the carrier group, and tag information of each carrier in the carrier group, and sends the detection results to the central control system;

at least one temporary storage area configured to communicate with the at least one gate, the at least one temporary storage area being further configured to receive a carrier group from the at least one gate, wherein the at least one temporary storage area is configured to have a quantity of carriers less than a predetermined value;

the at least one temporary storage area further comprising a temporary storage detection device installed thereon for detecting, for each temporary storage area, whether or not a carrier group is present, the quantity of carriers of the carrier group, and tag information of each of the carriers in the carrier group, and the temporary storage detection device is configured to send the detection results to the central control system.

A dynamic access management method based on the aforementioned dynamic storage device comprises the following steps:

(Step 1) receiving, by the at least one gate, a carrier group created through an object collection process;

(Step 2) detecting and sending, by the gate detection device, a quantity of carriers contained in the carrier group disposed at the at least one gate to the central control system, and comparing the quantity of carriers with the predetermined value determined by the central control system;

(Step 3) instructing, by the central control system, the power transmission device to move the carrier group disposed at the at least one gate to the at least one temporary storage area if the quantity of carriers is less than the predetermined value; instructing, by the central control system, the power transmission device, and the power carrying and moving device to send the carrier group disposed at the gate to a specified empty storage location if the quantity of carriers is equal to the predetermined value; and issuing, by the central control system, a warning message to instruct the power carrying and moving device, and the power transmission device, and the power carrying and moving device not to operate until extra carriers are removed if the quantity of carriers is greater than the predetermined value; and (Step 4) sending and recording, by the carrier detection device, tag information of each carrier in the carrier group to the central control system that corresponds to the empty storage location after the storage location receives the carrier group from the gate.

An object retrieval method based on the aforementioned dynamic access management method comprises the steps of:

(Step 1) searching, by the central control system, tag information of each carrier of the at least one storage area that corresponds to an object retrieval condition contained in an object retrieval instruction;

(Step 2) specifying, by the central control system, a storage location of a carrier group matched with the object retrieval condition;

(Step 3) controlling, by the central control system, the power transmission device, and the power carrying and moving device to take out a carrier group from the specified storage location, wherein the central control system automatically deletes the tag information of the carriers in the at least one storage location when the carrier group leaves its storage location;

(Step 4) controlling, by the central control system, the power transmission device to send a carrier group taken out from the at least one storage location to the at least one gate; or controlling the power transmission device to take out one or more carriers matched with the object retrieval condition from the carrier group using an object retriever;

(Step 5) instructing, by the central control system, the power transmission device to move any remaining carriers that are not matched with an object retrieval condition to the temporary storage area; and (Step 6) receiving, by the temporary storage area, the remaining unmatched carriers from the at least one gate, the at least one temporary storage detection device detecting whether or not a carrier group is present, the quantity of carriers of the carrier group, and tag information of the carriers in the carrier group, and sends the detection results to the central control system.

A temporary storage area management method based on the aforementioned dynamic access management method comprises the steps of:

(Step 1) randomly selecting a carrier in the temporary storage area, and stacking the carriers to a predetermined number to form a carrier group;

(Step 2) instructing, by the central control system, the carrier group to be moved from the temporary storage location to the at least one gate, and deleting the tag information of the carriers in the carrier group that have left the at least one temporary storage area;

the gate detection device detects the quantity of carriers contained in the carrier group that came from the at least one temporary storage area to the central control system, and the central control system compares the detected quantity of carriers with the predetermined value;

(Step 3) instructing, by the central control system, the power transmission device to return the carrier group disposed at the at least one gate to the at least one temporary storage area if the quantity of carriers is less than the predetermined value;

instructing, by the central control system, the power transmission device, and the power carrying and moving device to move the carrier group disposed at the at least one gate to an empty storage location that has been specified by the central control system if the quantity of carriers is equal to the predetermined value; and issuing, by the central control system, a warning message to instruct the power carrying and moving device, and the power transmission device not to operate until extra carriers are removed if the quantity of carriers is greater than the predetermined value; and (Step 4) recording, by the carrier detection device, tag information of each carrier in the carrier group in the empty storage location, and sending the results to the central control system, after the storage location receives the carrier group from the temporary storage area.

This invention has the following effects:

The RFID tag is a tag that allows repeated writing and reading and thus it can avoid the repeated tearing and sticking of the tag by the storage device manager. The tag information is the object data recorded into the carrier, and when the object of the carrier is changed, the original tag information should be removed before new tag information is rewritten.

In this invention, the RFID tag is adhered onto the carrier instead of the object. The storage device and various targets managed by the storage device of this invention are carriers and carrier groups. Since each carrier for forming the carrier group has detailed object information recorded in the RFID tag, therefore the management of the carrier and the carrier group can also achieve the effect of managing the object.

In an object collection process, the carrier group is created, and before each carrier is entered into the storage device, it is necessary to assign a RFID tag and establish complete tag information. In this context, a storage device manager does not need to know the content of the object or categorize the object during the object collection process, but simply needs to stack a predetermined number of carriers vertically to form the aforementioned carrier group.

In the dynamic access management method of this invention, the storage area, the storage location, the carrier group and the carrier are arranged dynamically without requiring previous categorization or other arrangements.

The dynamic access management method of this invention ensures that each storage location has two modes, one with a carrier group and the other one without a carrier group (empty), and each carrier group has a number of carriers specified by the central control system, so that the dynamic access management method can fully utilize the storage locations in the storage area. The utilization of storage areas is improved, so that the central control system can record all objects of each carrier in their storage areas without missing any record.

Therefore, this invention can overcome the drawbacks of the prior art.

BRIEF DESCRIPTION OF NUMERALS USED IN THE DRAWINGS

10: Central control system; 20: Storage area; 21: Storage location; 22: Carrier detection device; 30: Carrier group; 31: Carrier; 32: Tag; 40: Power carrying and moving device; 41: Power transmission device; 50: Gate; 51: Gate detection device; 60: Temporary storage area; 61: Temporary storage detection device; 100: Central control system; 200: Storage area; 210: Storage location; 220: Carrier detection device; 410: Power transmission device; 411: X-axis track; 412: Y-axis track; 413: hoist; 500: Gate; 510: Gate detection device; 600: Temporary storage area; 610: Temporary storage detection device.

DESCRIPTION OF THE PREFERRED EMBODIMENTS

To facilitate the description of the technical content of this invention, embodiments are used, and it is noteworthy that the proportion, dimensions, and amount of movement of each component, area, or device of the embodiments are drawn for the purpose of illustrating this invention only, but they are not necessary of the actual size or intended for limiting the scope of the invention.

First Embodiment

Figure 1:
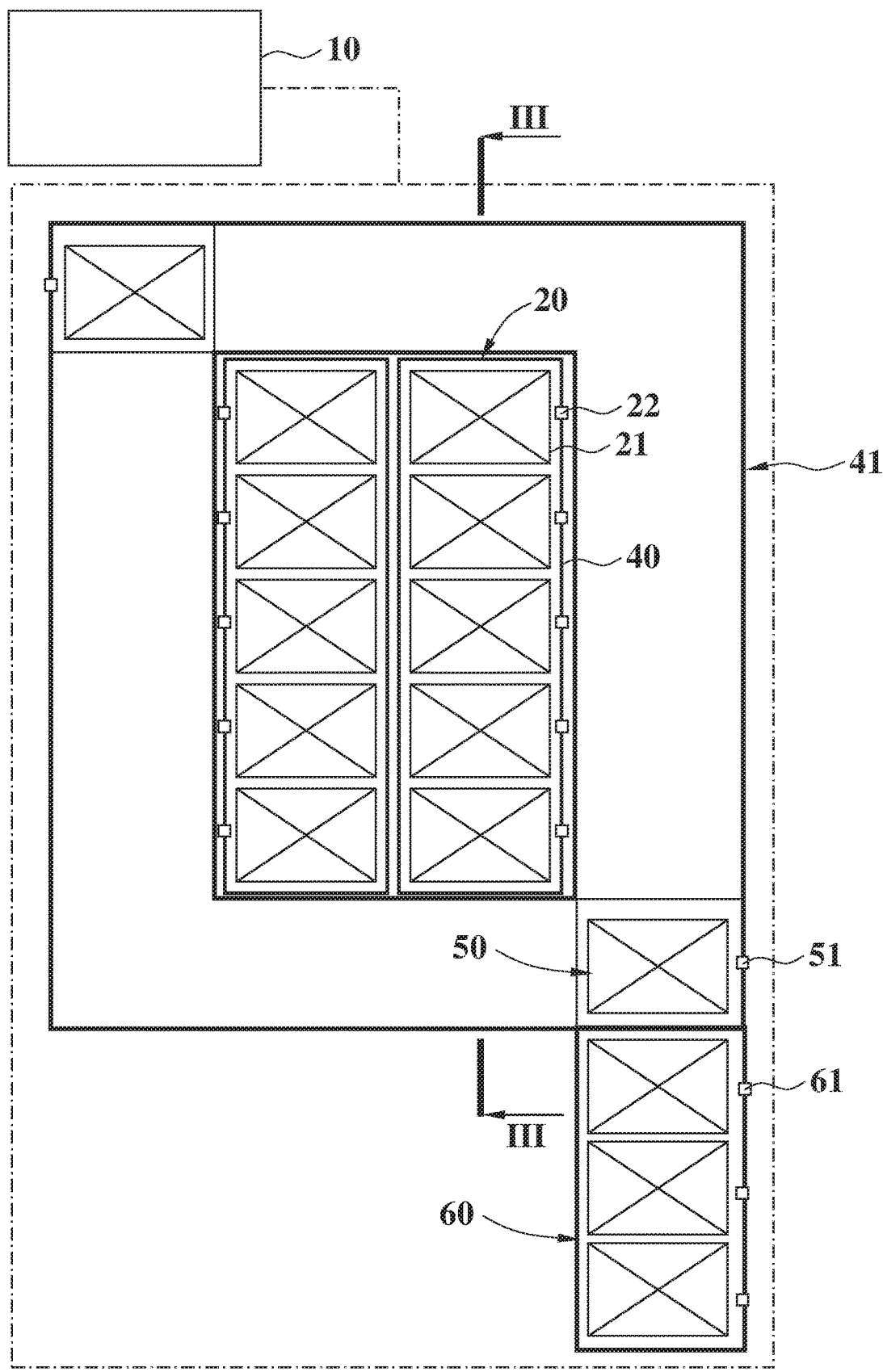
FIG. 1 is a planar top view of a dynamic storage device in accordance with a first embodiment of this invention.
Figure 2:
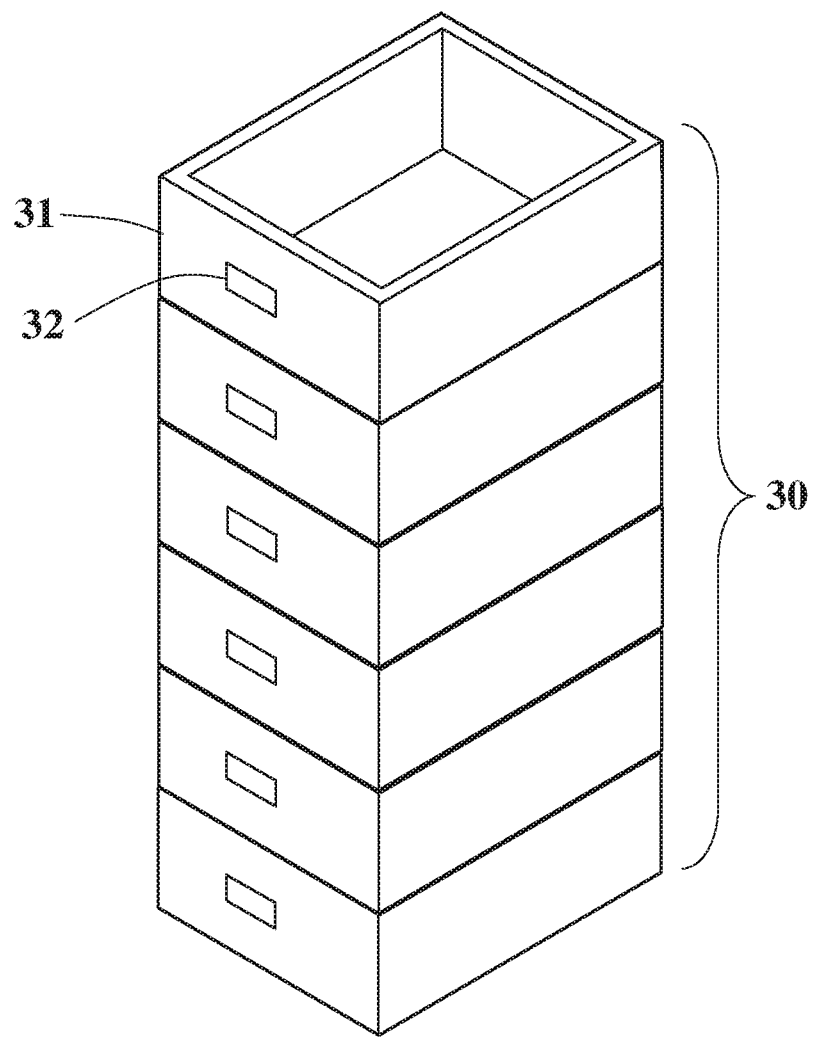
FIG. 2 is a schematic view of a carrier group of this invention.
Figure 3:
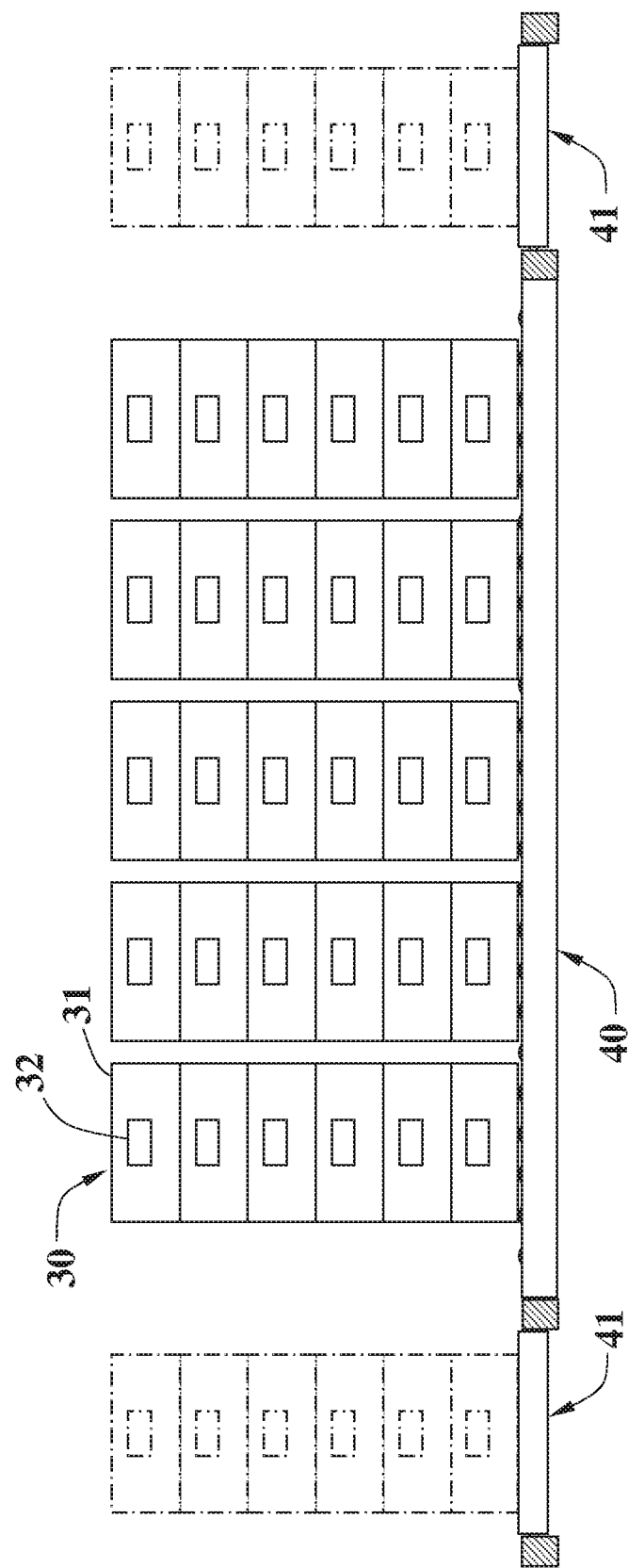
FIG. 3 is a cross-sectional view of Section III-III of FIG. 2.

This invention primarily includes a dynamic storage device and a dynamic access management method (including the processes of object collection, object retrieval, and object storage and the management of the temporary storage area) as shown in FIGS. 1 to 3.

The dynamic storage device comprises a storage area 20, a power carrying and moving device 40, a carrier group 30, a carrier detection device 22, a power transmission device 41, a gate 50, a gate detection device 51, a temporary storage area 60 and a temporary storage detection device 61. The storage device further comprises a central control system 10 for commanding, controlling, instructing and managing the operation of the aforementioned components, and managing the information retuned from each device. The power carrying and moving device 40 and the power transmission device 4 are power roller conveyors.

The storage area 20 includes the plurality of power carrying and moving devices 40, and the central control system 10 controls the direction and predetermined stop position of the power carrying and moving device 40 by programming; each power carrying and moving device 40 has a predetermined number of storage locations 21, and each of the storage locations 21 is recorded by the central control system 10; and each storage location 21 can receive a carrier group 30.

The carrier group 30 is formed by stacking a predetermined number of carriers 31; the carrier 31 includes but not limited to a basket, a pallet, a cabinet, a box, or any object carrying structure, but a common condition is that they can be stacked stably and securely. One or more kinds of objects may be contained in the carrier 31. Each carrier 31 is attached to a Radio Frequency IDentification (RFID) tag 32, and the tag 32 is capable of reading and writing tag information repeatedly; and the tag information is object data recorded in the carrier 31. The object data includes but not limited to object number, producer data, object specification, production time, transfer or delivery time, quantity, unit price, total price, tax amount, etc.

The carrier detection device 22 is installed in the storage area 20 for detecting whether or not each storage location 21 has a carrier group 30, reading each tag information of the carrier group 30, and sending the detected and read result to the central control system 10. The central control system 10 records each tag information of each carrier group 30 according to the storage location 21. Therefore, the central control system 10 clearly records each carrier 31 disposed at a specified storage location 21 of a specified storage area 20, and an object (or object set) stored in each storage location 21.

The power transmission device 41 communicates with the power transmission device 41 and the power carrying and moving device 40 using conventional devices that are well known in the prior art. The central control system 10 controls the direction and predetermined stop position of the power transmission device 41; the power transmission device 41 and the power carrying and moving device 40 control a carrier group 30 to enter a storage location 21 specified by the central control system 10; the power transmission device 41 and the power carrying and moving device 40 also control a carrier group 30 to move from its own storage location 21.

The gate 50 communicates with the power transmission device 41 and serves as a throughput for carrier 31 collection and carrier 31 retrieval. A carrier group 30 to be removed from or entered into the storage area 20 is placed at the gate 50.

The gate detection device 51 sends the gate 50 with or without the carrier group 30, the quantity of carriers 31 contained in the carrier group 30 and each tag information of the carrier group 30 to the central control system 10 to facilitate the central control system 10 to manage the detailed location of each carrier 31.

The temporary storage area 60 communicates with the gate 50 for receiving the carrier groups 30 coming from the gate 50 and the carrier groups 30 not reaching the predetermined value of the carriers 31.

The temporary storage detection device 61 detects quantity of carriers 31 and tag information of the carriers 31 in the carrier group 30, and sends the detection results to the central control system 10—to facilitate the central control system 10 to manage the detailed location of each carrier 31.

This invention adopts a RFID tag 32 that can be read and written repeatedly to avoid the situation of tearing and sticking the tag by the storage device manager frequently as well as the problems of sticking a wrong tag or peeling off the tag. The tag information is the object data recorded in the carrier 31. When the object of the carrier 31 is changed, the central control system 10 deletes the original tag information, and rewrite new tag information.

There are various management methods and programming designs of the storage area 20 and storage location 21, and they can be changed according to different power carrying and moving devices 40 and power transmission devices 41. Based on the requirements as described in the specification, this invention uses an embodiment to illustrate the method of this invention, but the embodiment is not intended for limiting the method of the invention. For example, an exclusive code (such as capitalized letters A, B, C, etc.) is assigned to a storage area 20; an exclusive code (such as Arabic numerals 01, 02, 03, 04, etc.) is assigned to each storage location 21; so that "A01" represents Storage Location No. 01 in Storage Area A, and A09 represents Storage Location No. 09 in Storage area A; and these exclusive codes are recorded in the central control system 10.

The storage device creates a carrier group 30 during the object collection process. Before entering into the storage device, each carrier 31 is assigned with a RFID tag 32 and complete tag information is established. In this context, a storage device manager does not need to know the content of the object or categorize the object during the object collection process, but simply needs to stack a predetermined number (such as six preset by the central control system 10) of carriers 31 vertically to form the aforementioned carrier group 30. Each carrier 31 has a RFID tag 32, and the tag information is the object data (such as lower case letters a, b, c, etc.), and carriers 31 of the carrier group 30 are created randomly without any categorization or arrangement. If a carrier group 30 includes six carriers 31, then there will be six pieces of tag information a, b, c, d, e, f, and this carrier group 30 will be stored in the aforementioned A01 position. The carrier detection device 22 will read and send the storage location 21 and tag information to the central control system 10. The central control system 10 will attach the six pieces of tag information to the position A01 and record the tag information. In other words, a storage location 21 having tag information in the central control system 10 is one having a carrier group 30; and a storage location 21 without any tag information is an empty storage location 21.

Figure 4:
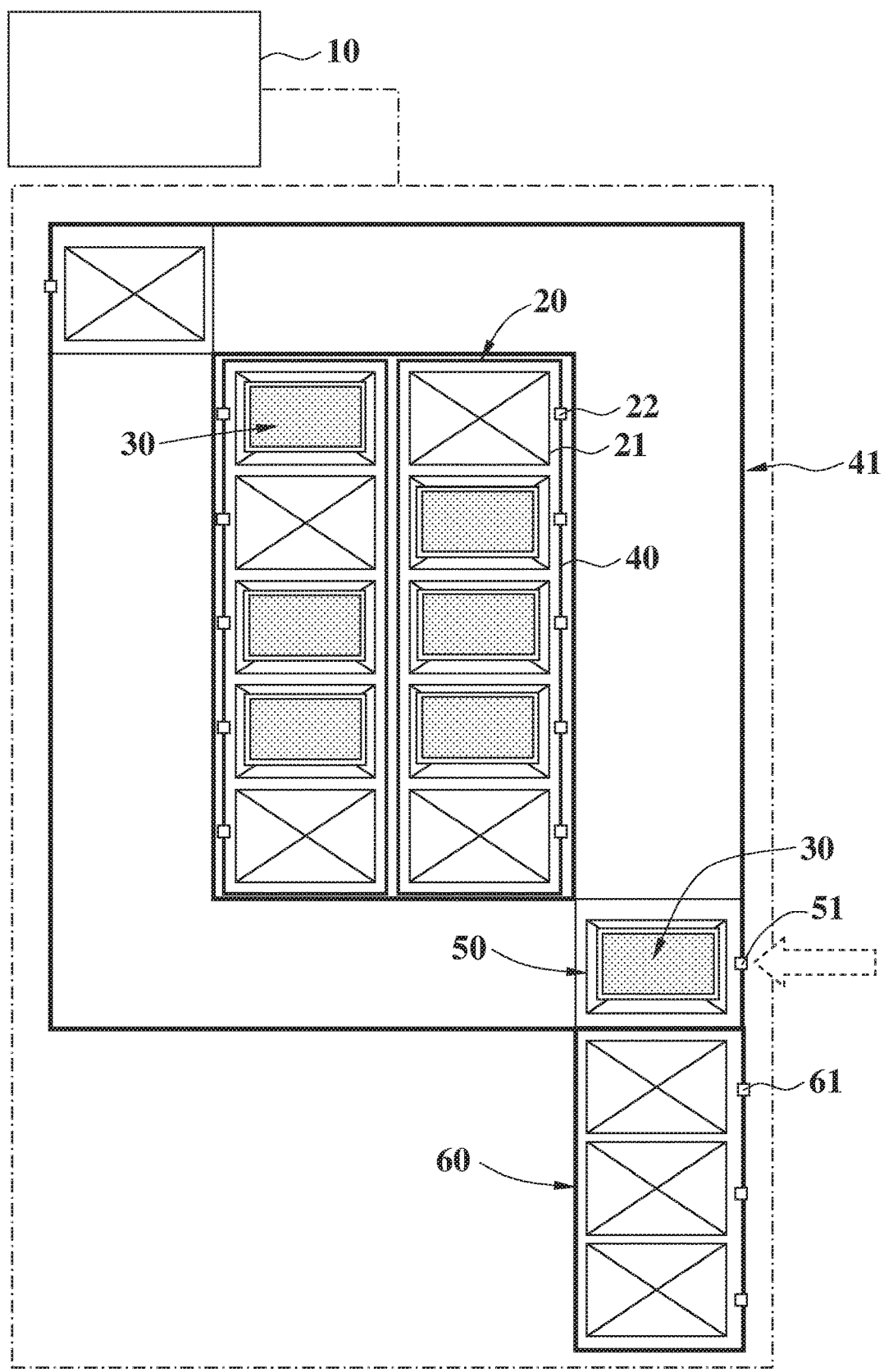
FIG. 4 is a first schematic view of a dynamic access management method in accordance with the first embodiment of this invention.
Figure 5:
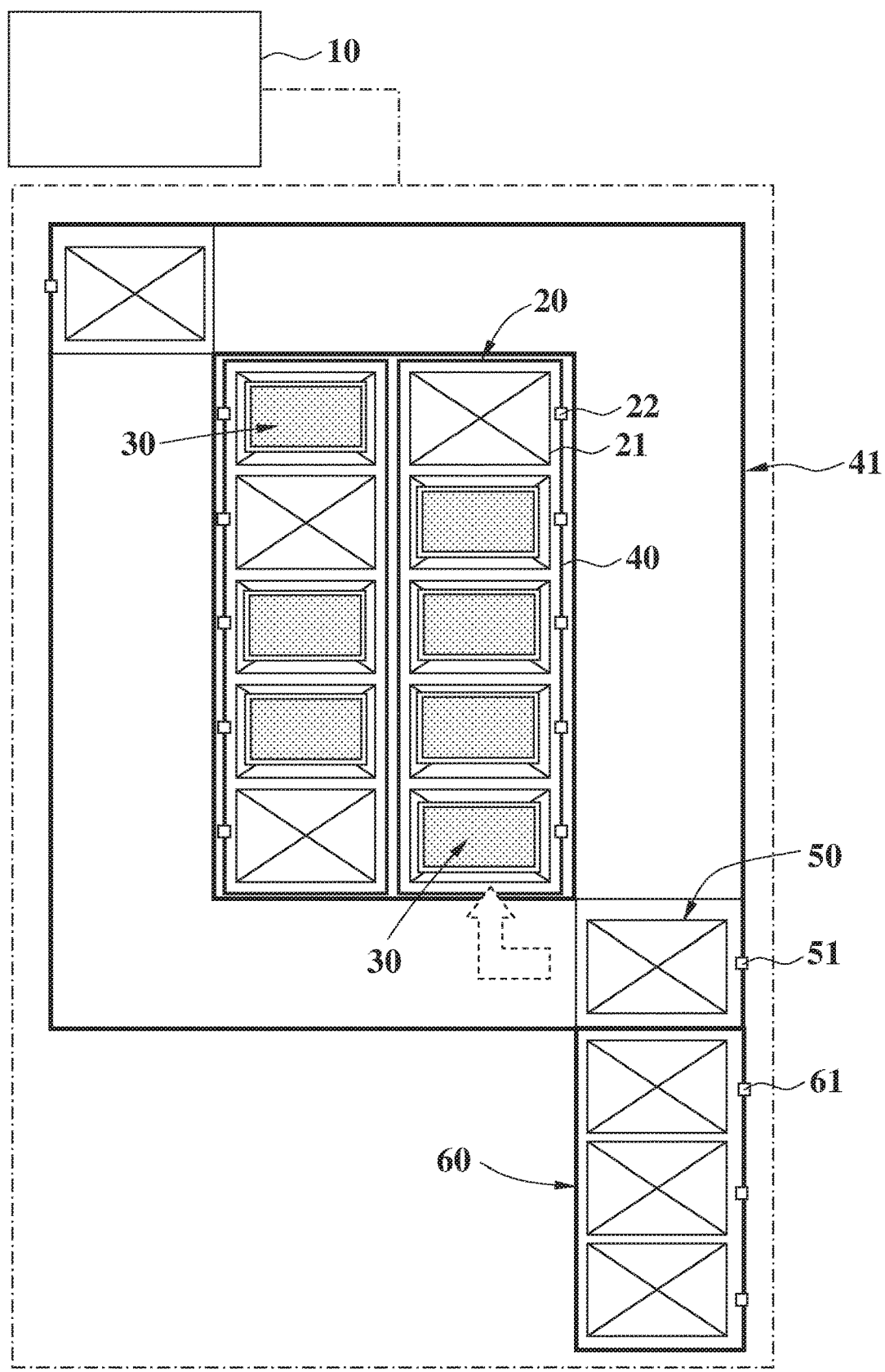
FIG. 5 is a second schematic view of a dynamic access management method in accordance with the first embodiment of this invention.

In FIGS. 4 and 5, the dynamic access management method (regarding to the object collection process management) can be implemented by the principle for creating the aforementioned devices and carrier group 30, and the dynamic access management method comprises:

(Step 1) receiving a carrier group 30 created according to the aforementioned object collection process by the gate 50;

(Step 2) detecting the quantity of carriers 31 of the gate 50 contained in the carrier group 30 by the gate detection device 51 and sending the quantity of carriers 31 to the central control system 10, and comparing the quantity of carriers 31 with a predetermined value by the central control system 10;

(Step 3) instructing, by the central control system 10, the power transmission device 41 to move the carrier group 30 disposed at the at least one gate 50 to the at least one temporary storage area 60 if the quantity is less than or equal to—the predetermined value; instructing, by the central control system 10, the power transmission device 41 and the power carrying and moving device 40 to send the carrier group 30 disposed at of the gate 50 to a specific empty storage location if the quantity of carriers 31 is less than or equal to the predetermined value; and issuing, by the central control system 10, a warning message to instruct the power carrying and moving device 40, and the power transmission device 41 not to operate until extra carriers 31 are removed if the quantity of carriers 31 is greater than the predetermined value;

(Step 4) sending and recording the storage location 21 and tag information to the central control system 10 by the carrier detection device 22, after receiving the carrier group 30 coming from the gate 50 by the empty storage location 21.

The dynamic access management method of this invention ensures that each storage location 21 has two modes, one with a carrier group 30 and the other one without a carrier group 30 (empty), and each carrier group 30 has a number of carriers 31 specified by the central control system 10, so that the dynamic access management method and the storage devices can fill up all storage locations 21 of the storage area and fully utilize the storage locations in the storage area. The central control system 10 manages the location information and tag information of what object stored in each storage location 21. The central control system 10 ensures that all objects in each carrier 31 are recorded into their storage locations 21 without missing any record. In the dynamic access management method of this invention, the placement of storage areas 20, storage locations 21, carrier group 30, and carrier 31 are managed dynamically without requiring previous categorization and arrangement.

Figure 6:
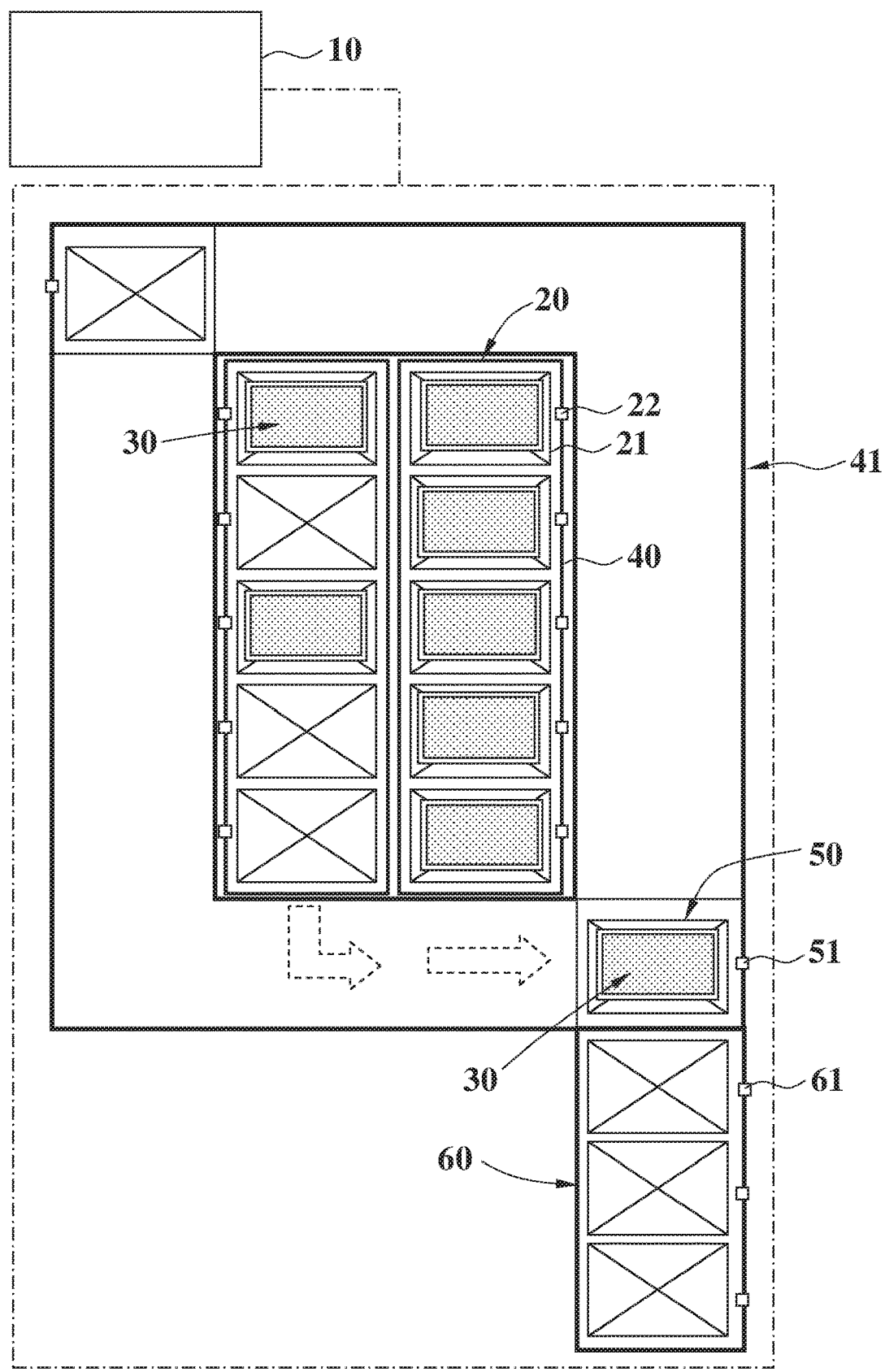
FIG. 6 is a first schematic view of an object retrieval method in accordance with the first embodiment of this invention.
Figure 7:
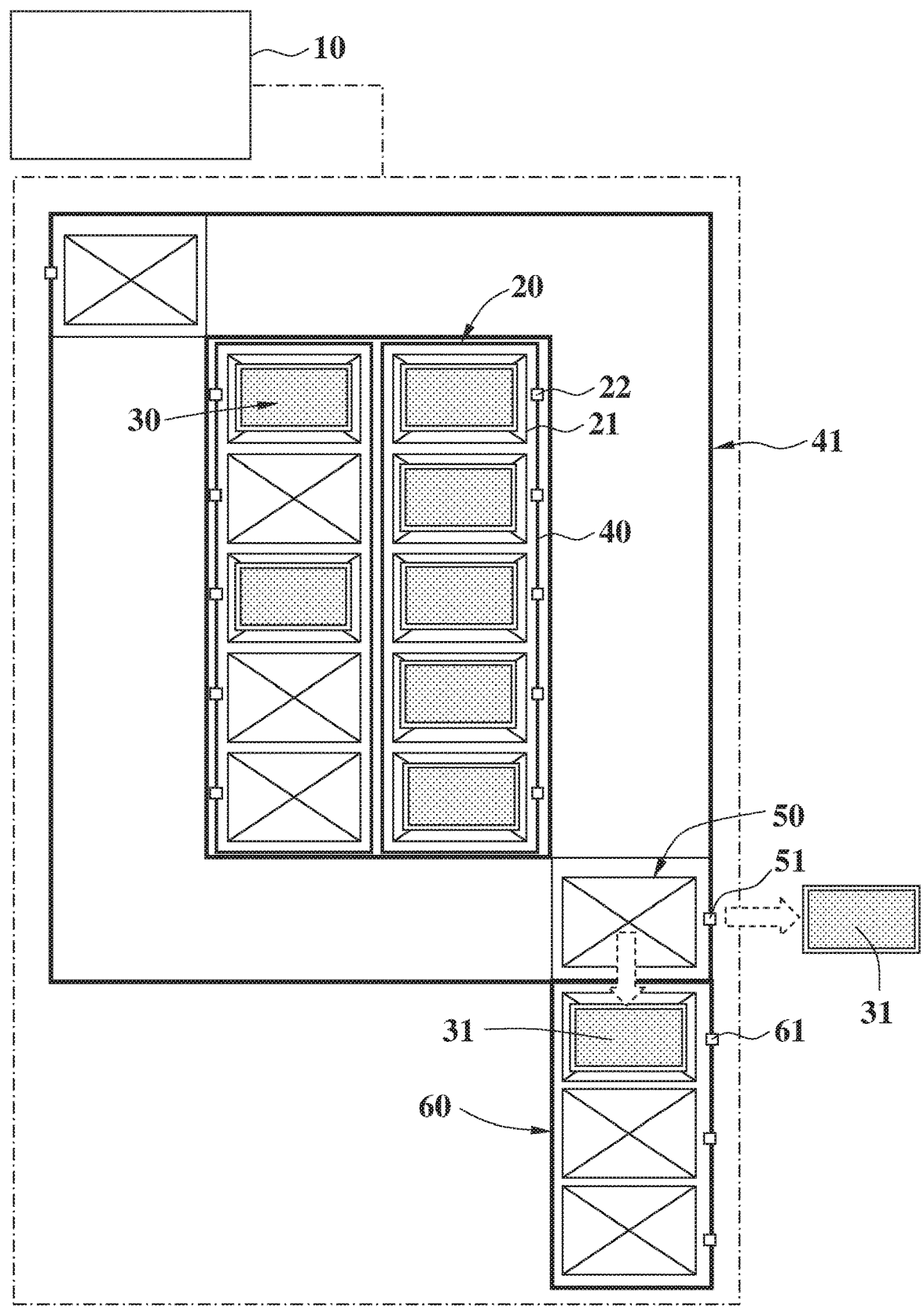
FIG. 7 is a second schematic view of an object retrieval method in accordance with the first embodiment of this invention.
Figure 8:
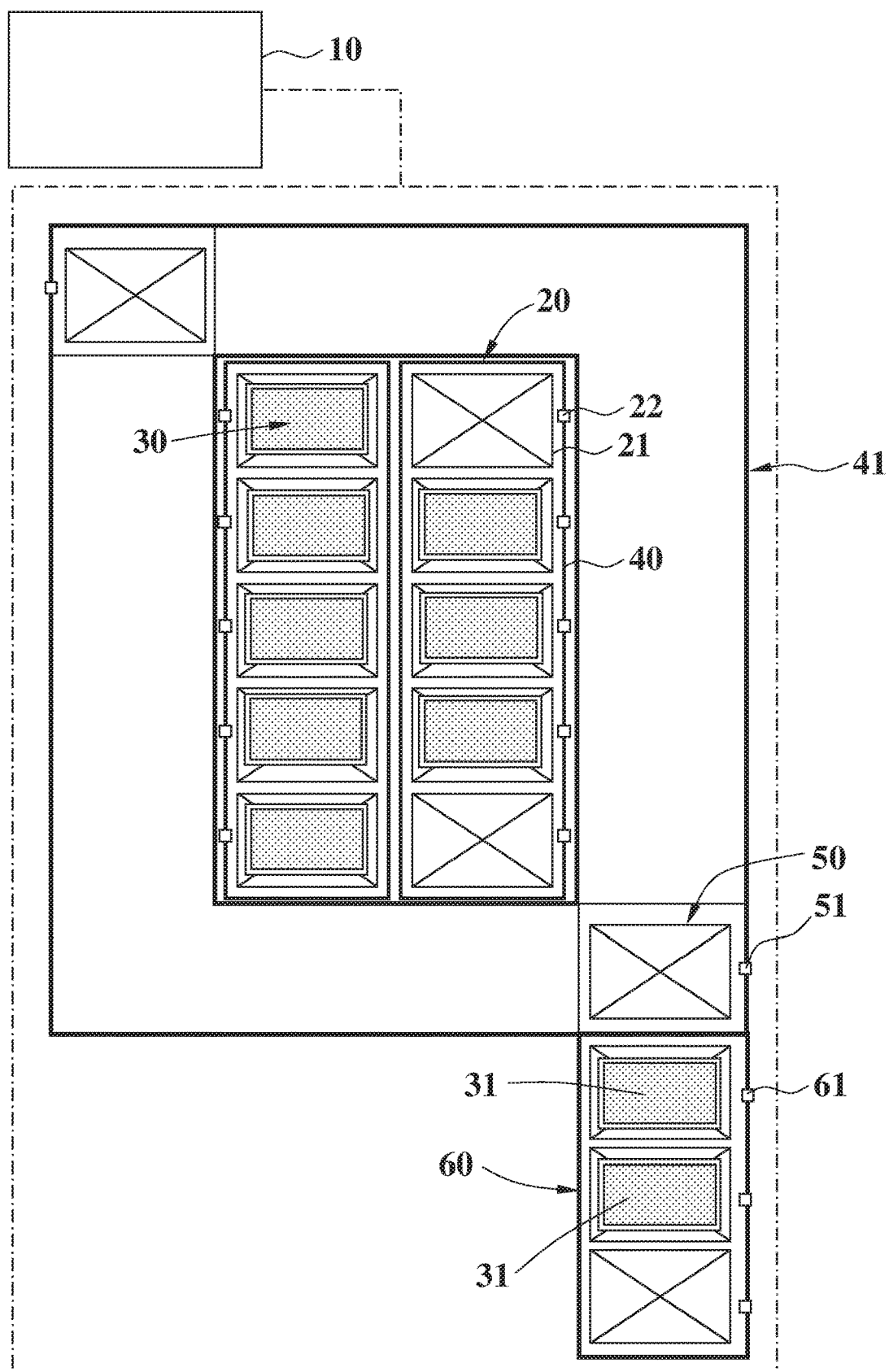
FIG. 8 is a first schematic view of a temporary storage area management method in accordance with the first embodiment of this invention.
Figure 9:
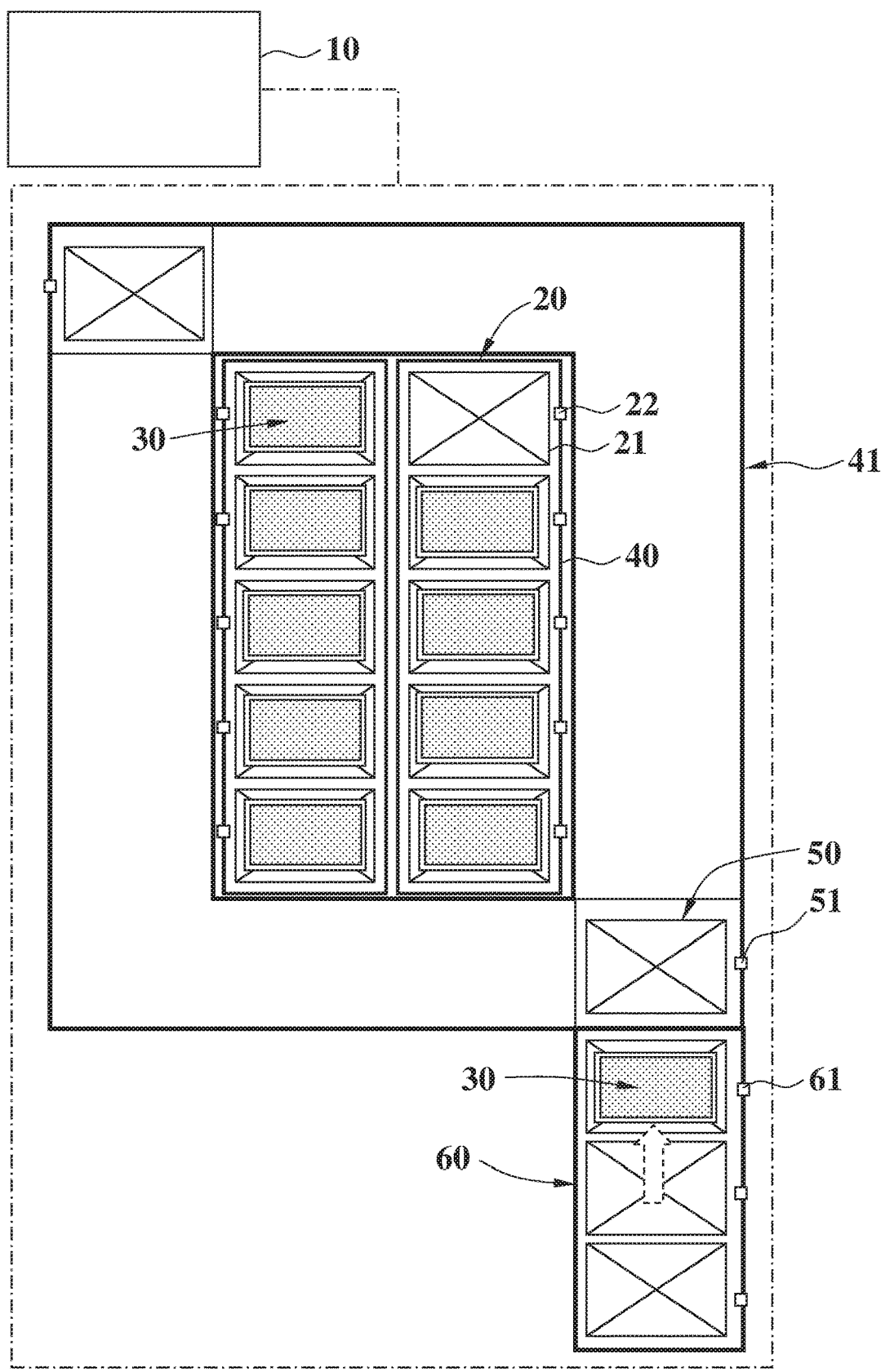
FIG. 9 is a second schematic view of a temporary storage area management method in accordance with the first embodiment of this invention.
Figure 10:
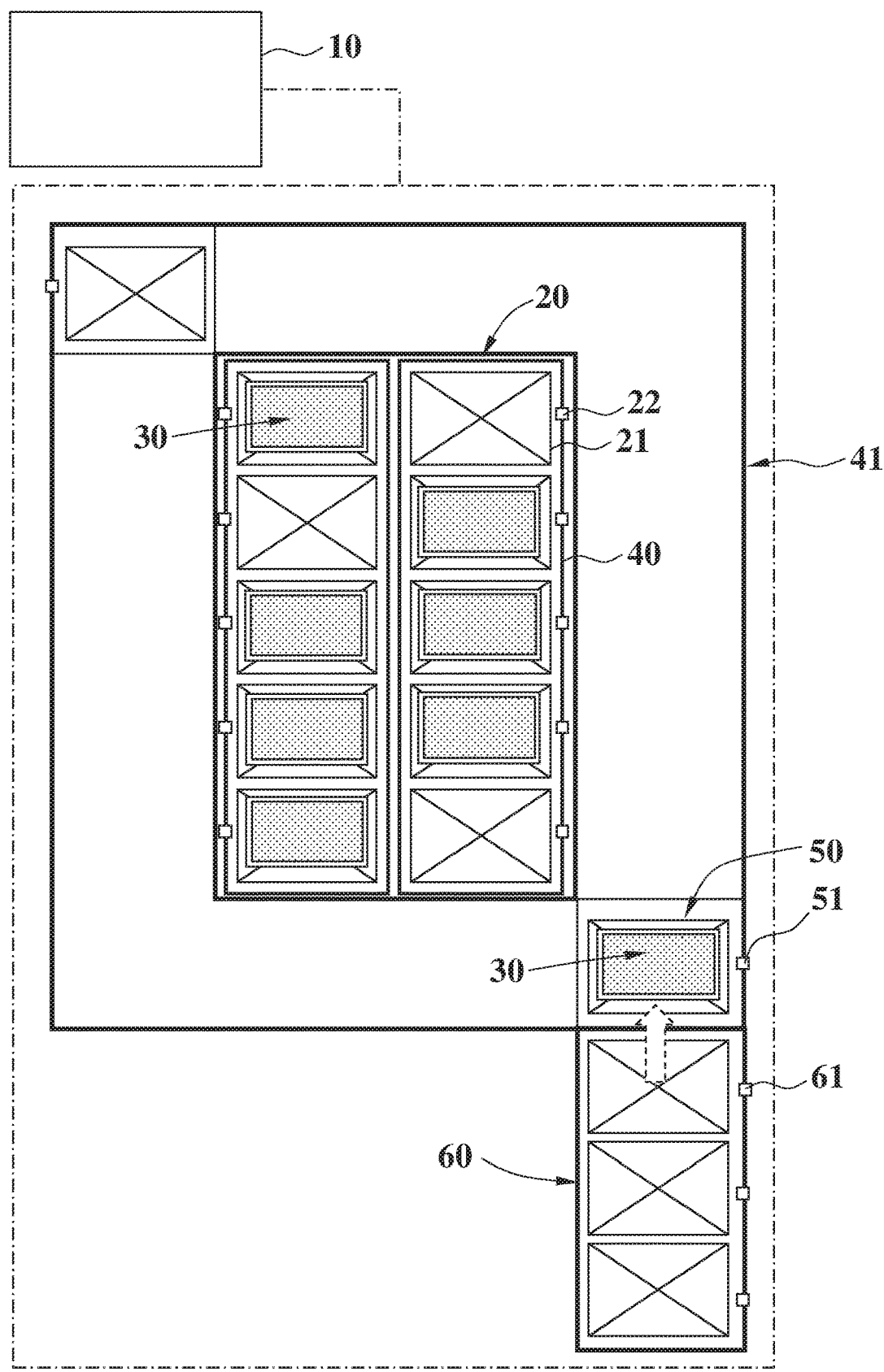
FIG. 10 is a third schematic view of a temporary storage area management method in accordance with the first embodiment of this invention.
Figure 11:
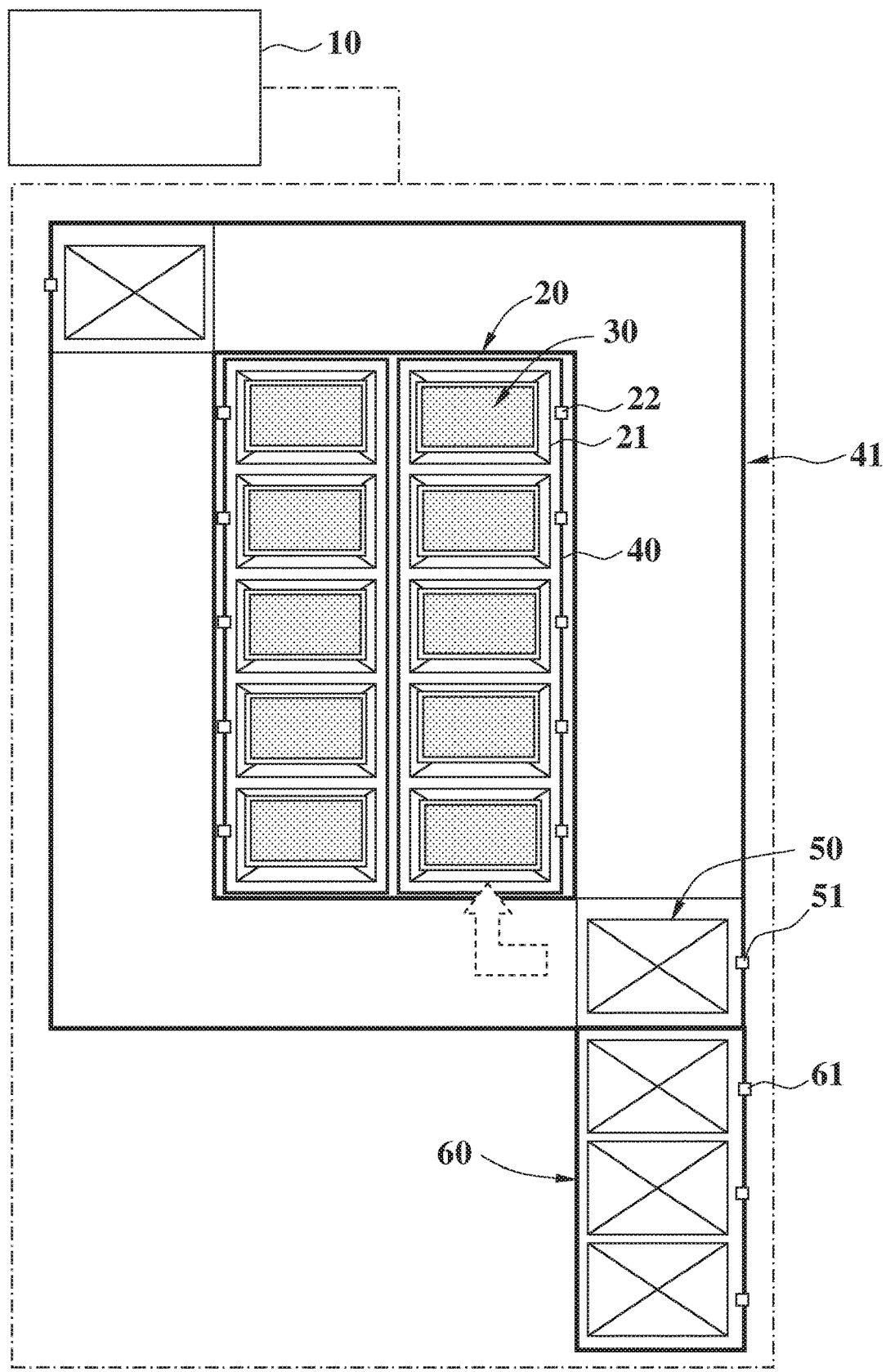
FIG. 11 is a fourth schematic view of a temporary storage area management method in accordance with the first embodiment of this invention.

In FIGS. 6 and 7, an object retrieval method based on the aforementioned storage device and dynamic access management method of this invention comprises:

(Step 1) The central control system 10 searches each tag information of the storage area according to the retrieval condition included in an object retrieval instruction; the central control system 10;

(Step 2) The central control system 10 indicates the storage location 21 of a carrier group 30 matched with the object retrieval condition, wherein there may be one or more storage locations 21, since the carriers 31 matched with the object retrieval condition are randomly distributed in the storage area 20;

(Step 3) The central control system 10 controls the power transmission device 41 and the power carrying and moving device 40 to take out the carrier group 30 from the indicated storage location 21, and automatically deletes the tag information of the storage location 21 automatically when the carrier group 30 leaves its storage location 21, and in Step 2, if several storage locations have the carriers 31 matched with the object retrieval condition, then the power transmission device 41 and the power carrying and moving device 40 will remove the carrier groups 30 from the storage locations 21 specified by the central control system 10 one by one sequentially;

(Step 4) The central control system 10 controls the power transmission device 41 to transmit the carrier group 30 taken out from the storage location 21 to the gate 50, and an object retriever (who may be a natural person or a robot) removes the carrier group 30 from the gate 50 or takes out one or more carriers 31 matched with the object retrieval condition from the carrier group 30, wherein if the object retriever is a robot in this embodiment, then the central control system 10 will send the data of the tag 32 of the object retriever to the robot in advance, and the robot will find and take out the target carrier 31 quickly according to the data of the tag 32; if the object retriever is a natural person, then a RFID reader may be used to read the tag 32 to confirm the target carrier 31; and after the gate detection device 51 has read the tag information, the target carrier 31 will be displayed and provided for a natural person who is an object retriever to retrieve the target carrier 31;

(Step 5) The central control system 10 instructs the power transmission device 41 to move the remaining carrier 31 to the temporary storage area 60 after the object is retrieved, if the gate has any remained carrier 31 not matched with the object retrieval condition and not taken away; and (Step 6) The temporary storage detection device 60 receives the remaining carrier 31 from the gate 50 to the temporary storage area 60, and sending and recording the temporary storage area 60 with or without the carrier group 30, the quantity of carriers 31 of the carrier group 30, and each tag information of the carrier group 30 to the central control system 10 to facilitate the central control system 10 to manage each carrier 31 definitely in detail.

Based on the aforementioned purpose, the object retrieval method of this invention ensures that each storage location 21 has two modes, one with a carrier group 30 and the other one without a carrier group 30 (empty), and each carrier group 30 has a number of carriers 31 specified by the central control system 10, so that the storage device and method can fill up each storage location 21 of the storage area 20. The carrier group 30 with insufficient quantity of carriers 31 is arranged in the temporary storage area 60 and still controlled and managed by the central control system 10.

With reference to FIGS. 8 to 11 for a temporary storage area management method based on the aforementioned storage device and dynamic access management method of this invention, the temporary storage area management method comprises the steps of:

(Step 1) randomly selecting a carrier 31 in the temporary storage area 60, and stacking the carriers to a predetermined number to form a carrier group 30, wherein the carrier group 30 is created as described in Paragraph 15 of the specification of this invention;

(Step 2) moving the carrier group 30 of the temporary storage area 60 to the gate 50, and the carrier group 30 leaving the temporary storage area 60, and removing the tag information of the carrier group 30 from the temporary storage area 60; the gate detection device 51 detecting and sending the quantity of carriers 31 contained in the carrier group 30 and coming from the temporary storage area 60 to the central control system 10, and the central control system 10 comparing the quantity of carriers 31 with a predetermined value;

(Step 3) instructing the power transmission device 41 to move the carrier group 30 with insufficient carriers 31 to the temporary storage area 60 and not to enter into the storage area 20 by the central control system 10 if the quantity of carriers 31 is less than a predetermined value; instructing the power transmission device 41 and the power carrying and moving device 40 by the central control system 10 to send the carrier group 30 of the gate 50 to an empty storage location 21 specified by the central control system 10 if the quantity of carriers 31 is equal to the predetermined value; and issuing a warning message by the central control system 10 to instruct the power carrying and moving device 40 and the power transmission device 41 not to operate, but to wait for a storage device manager to remove extra carrier 31 if the quantity of carriers 31 is greater than the predetermined value; and (Step 4) sending and recording each tag information of the storage location 21 to the central control system 10 by the carrier detection device 22 after receiving the carrier group 30 removed from the temporary storage area 60 by the empty storage location 21.

In the temporary storage area management method of this invention, scattered carriers 31 in the temporary storage area 60 are integrated to build one or more complete carrier groups 30, and this method still upholds the purpose of creating the carrier group 30, and the storage device manager needs not to know about the objects of the carrier 31 in the temporary storage area 60 or categorize the objects in the temporary storage area 60 in advance carrier, and the storage device management simply needs stack a predetermined number of carrier 31 vertically to form a carrier group 30. The positions for placing the carrier groups 30 and carriers 31 are specified dynamically without previous categorization or arrangement. The scattered carriers 31 in the temporary storage area 60 are integrated into a carrier group 30 which is sent back to the storage area 20 for storage, and such arrangement still upholds the aforementioned purpose and ensures that each storage location 21 only have two modes, one with a carrier group 30 and the other one without a carrier group 30 (empty), and each carrier group 30 has a number of carriers 31 specified by the central control system 10, so that the storage device and method can fully utilize each storage location 21 of the storage area 20.

Second Embodiment

The major difference between the first and second embodiments of this invention resides on that the storage area of the second embodiment does not have the power carrying and moving device and the power transmission device for moving the carrier group is a crane. Other components such as the carrier group 30, carrier detection device 22, gate 50, gate detection device 51, temporary storage area 60 and temporary storage detection device 61 are the same as those of the first embodiment and thus their description will not be repeated.

Figure 12:
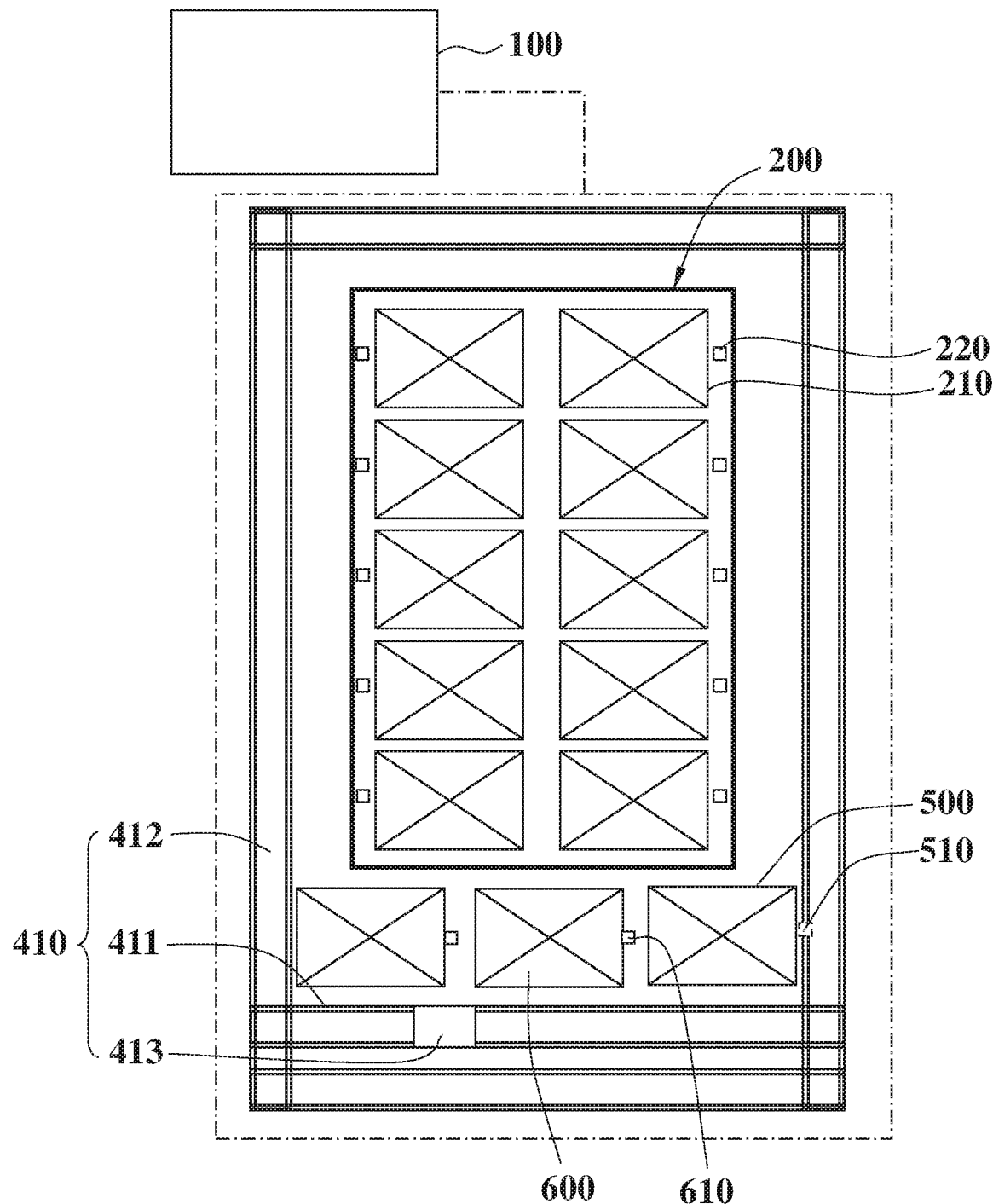
FIG. 12 is a planar top view of a dynamic storage device in accordance with a second embodiment of this invention.
Figure 13:
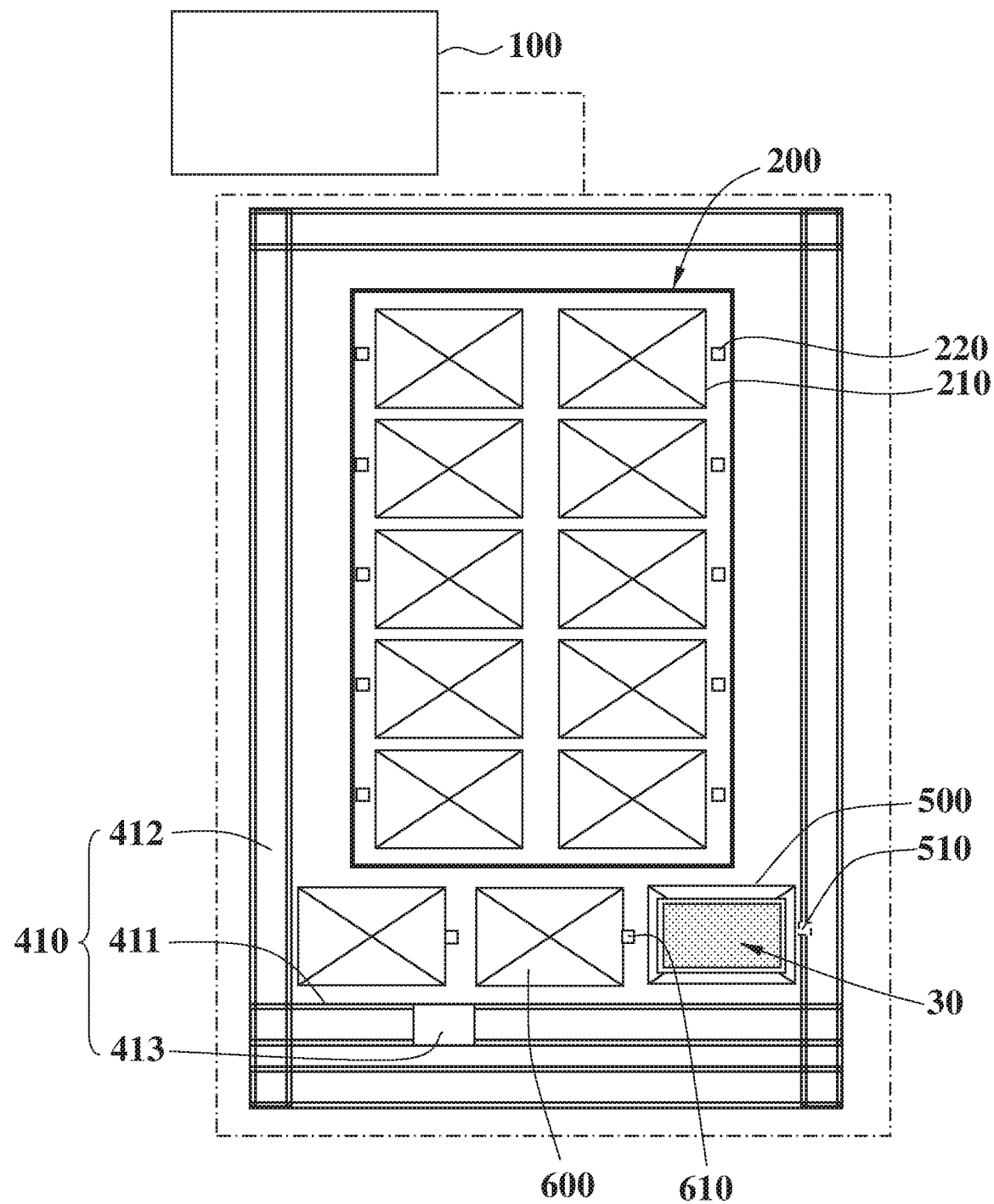
FIG. 13 is a first schematic view of a device storage method in accordance with the second embodiment of this invention.
Figure 14:
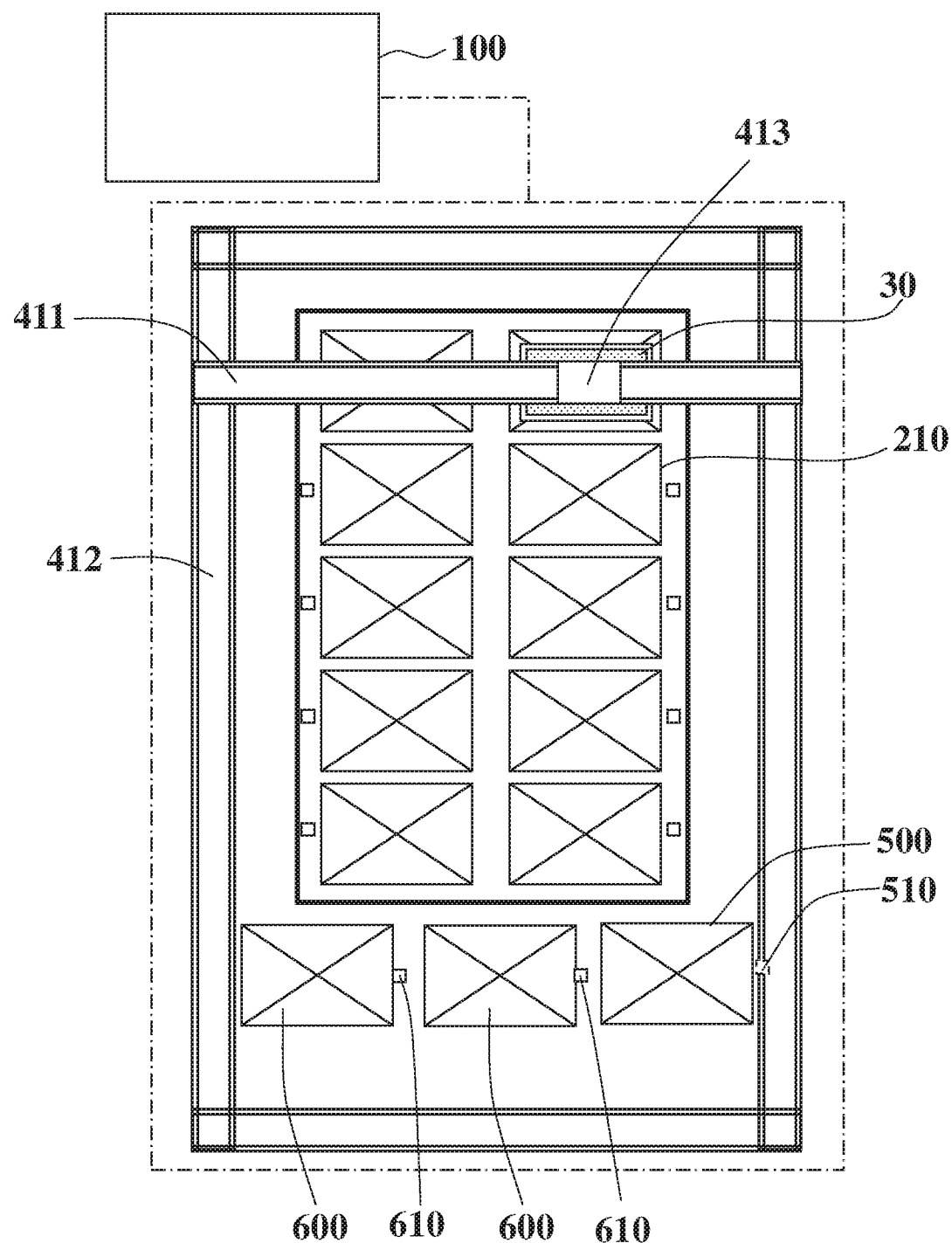
FIG. 14 is a second schematic view of a device storage method in accordance with the second embodiment of this invention.

In FIGS. 12 to 14, a predetermined number of storage locations 210 are created in the storage area 200 of the second embodiment, and the storage locations 210 are recorded by the central control system 100, and a carrier group 30 may be placed in each storage location 210. In the second embodiment, the power transmission device 410 is a crane. In the figures, a Y-axis track 412 of the crane is disclosed, an X-axis track 411 is operated reciprocally along the Y-axis track 412, and a hoist 413 is operated reciprocally along the X-axis track 411 and capable of ascending/descending vertically (in the direction of the Z-axis). The central control system 100 controls the X-, Y- and Z-axes movement of the hoist 413, so that the hoist 423 can carry the carrier group 30 to move to a range above the storage location 210, the gate 50, or the temporary storage area 60, or access the carrier group 30 at the storage location 210, the gate 50, or the temporary storage area 60.

To support the claims of this invention by the specification, the second embodiment of this invention includes a dynamic storage device and a dynamic access management method (including the processes of object collection, object retrieval, object storage and the management of temporary storage areas) as described below:

The dynamic storage device of the second embodiment comprises:

a central control system 100;

a storage area 200, having a predetermined number of storage locations 210, and the storage locations 210 being recorded by the central control system 100, and each storage location 210 being provided for randomly placing a carrier group 30;

a carrier detection device 200, installed in the storage area 200, for sending a detected result of each storage location 210 with or without a carrier group 30, and each read tag information of the carrier group 30 to the central control system 100; and the central control system 100 recording the tag information of each carrier group 30 according to the storage location 210;

a power transmission device 410, controlled by the central control system 100 to displace to move the carrier group 30 into one or more storage locations 210 or take out the carrier group 30 from one or more storage locations 210 specified by the central control system 100;

a gate 500, disposed adjacent to the storage area 200; the carrier group 30 removed from or entered into the storage area 200 being disposed at the gate 500; the gate 500 having a gate detection device 510 for sending the gate 500 with or without the carrier group 30, the quantity of carriers 31 contained in the carrier group 30, and each tag information of the carrier group 30 to the central control system 100;

a temporary storage area 600, communicating to the gate 500, for receiving carrier group 30 coming from the gate 500 and having the quantity of carriers 31 less than the predetermined value; the temporary storage area 600 having a temporary storage detection device 610 for sending the temporary storage area 600 of the carrier group 30, the quantity of carriers 31 in the carrier group 30, and each tag information of the carrier group 30 to the central control system 100.

The dynamic access management method of the second embodiment comprises the steps of:

(Step 1) receiving a carrier group 30 created in an object collection process by the gate 500;

(Step 2) detecting and sending the quantity of carriers 31 contained in the carrier group 30 of the gate 500 to the central control system 100 by the gate detection device 510, and comparing the quantity of carriers 31 with a predetermined value by the central control system 100;

(Step 3): instructing the power transmission device 410 to move the carrier group 30 of the gate 500 to the temporary storage area 600 by the central control system 100 if the quantity of carriers 31 is less than the predetermined value; instructing the power transmission device 410 to move the carrier group 30 of the gate 500 to an empty storage location 210 specified by the central control system 100 if the quantity of carriers 31 is equal to the predetermined value, by the central control system 100; and issuing a warning message by the central control system 100 to instruct the power carrying and moving device not to operate until the extra carrier 31 is removed if the quantity of carriers 31 is greater than the predetermined value; and (Step 4) sending and recording each tag information of the carrier group 30 to the central control system 100 by the carrier detection device 200 corresponding to the empty storage location 210 after receiving the carrier group 30 coming from the gate 500.

The object retrieval method of the second embodiment comprises: (Step 1) searching each tag information of the storage area 200 according to an object retrieval condition of an object retrieval instruction by the central control system 100;

(Step 2) specifying a storage location 21 of the carrier group 300 matched with the object retrieval condition by the central control system 100;

(Step 3) controlling the power transmission device 410 to take out the carrier group 30 from the specified storage location 210 by the central control system 100, and deleting the tag information of the storage location 210 automatically when the carrier group 30 leaves its storage location 210;

(Step 4) controlling the power transmission device 410 to move the carrier group 30 taken out from the storage location 210 to the gate 500 by the central control system 100, and taking the carrier group 30 away from the gate 500 or one or more carriers 31 matched with the object retrieval condition from the carrier group 30 by an object retriever;

(Step 5) instructing the power transmission device 410 to move the remaining carrier 31 to the temporary storage area 600 by the central control system 100 after retrieving the object, if the gate 500 has carriers 31 not matched with the object retrieval condition and not taken away;

(Step 6) receiving the remaining carrier 31 from the gate 500 to the temporary storage area 600, and sending and recording the temporary storage area 600 with or without the carrier group 30, the quantity of carriers 31 of the carrier group 30, and each tag information of the carrier group 30 to the central control system 100 by the temporary storage detection device 600.

The temporary storage area 600 management method of the second embodiment comprises the steps of:

(Step 1) randomly selecting a carrier 31 in the temporary storage area 600, and stacking a predetermined number of carriers 321 to form a carrier group 30;

(Step 2) instructing the power transmission device 410 to move the carrier group 30 of the temporary storage area 600 to the gate 500 by the central control system 100, and the carrier group 30 leaving the temporary storage area 600, and deleting the tag information of the carrier group 30 from the temporary storage area 600; detecting and sending the quantity of carriers 31 coming from the temporary storage area 600 and contained in the carrier group 30 to the central control system 100 by the gate detection device 510, and comparing the quantity of carriers 31 with a predetermined value by the central control system 100;

(Step 3) instructing the power transmission device 410 to return the carrier group 30 of the gate 500 to the temporary storage area 600 by the central control system 100 if the quantity of carriers 31 is less than the predetermined value; instructing the power transmission device 410 by the central control system 100 to send the carrier group 30 of the gate 500 to an empty storage location 210 specified by the central control system 100 if the quantity of carriers 31 is equal to the predetermined value; and issuing a warning message to instruct the power carrying and moving device not to operate until removing the extra carrier 31 by the central control system 100 if the quantity of carriers 31 is greater than predetermined value;

(Step 4): sending and recording each tag information of the storage location 210 to the central control system 100 by the carrier detection device 200 after the empty storage location 210 receives the carrier group 30 moved from the temporary storage area 600.

What is claimed is:

1. A dynamic storage device, comprising:
a central control system;
at least one storage area having a plurality of power carrying and moving devices, the central control system controlling the direction and predetermined stop positions for each in the plurality of power carrying and moving devices; wherein
each power carrying and moving device comprises a predetermined number of storage locations within the at least one storage area, wherein the central control system dynamically assigns a carrier group to one of the storage locations;
each storage location is recorded by the central control system; and
the carrier group is formed by stacking a predetermined number of carriers, each carrier carrying at least one object, and each carrier comprising a Radio Frequency Identification (RFID) tag attached thereto, the RFID tag having tag information that can be written and read repeatedly, wherein the tag information records object data of the carrier;
a carrier detection device, installed in the at least one storage area and configured to detect whether or not the storage locations have a carrier group assigned thereto, wherein
the carrier detection device sends a detection result of each storage location to the central control system;
the carrier detection device reads and sends tag information of each carrier in the carrier group to the central control system; and
the central control system records the tag information of each carrier in the carrier group and associates the tag information with the storage locations;
a power transmission device configured to communicate with the plurality of power carrying and moving devices, wherein
the power transmission device is controlled by the central control system to move and to stop; and
the power transmission device and each in the plurality of power carrying and moving devices control the carrier group to enter into or move out of a storage location that has been specified by the central control system;
at least one gate configured to communicate with the power transmission device; wherein
the at least one gate moves a carrier group disposed at the gate out of the at least one storage area, or into the at least one storage area; and
the at least one gate comprises a gate detection device, wherein the gate detection device detects, for each gate, whether or not a carrier group is present, the quantity of carriers contained in the carrier group, and tag information of each carrier in the carrier group, and sends the detection results to the central control system;
at least one temporary storage area configured to communicate with the at least one gate, the at least one temporary storage area being further configured to receive a carrier group from the at least one gate, wherein
the at least one temporary storage area is configured to have a quantity of carriers less than a predetermined value; and
the at least one temporary storage area further comprises a temporary storage detection device installed thereon for detecting, for each temporary storage area, whether or not a carrier group is present, the quantity of carriers of the carrier group, and tag information of each of the carriers in the carrier group, and the temporary storage detection device is configured to send the detection results to the central control system.

2. A dynamic access management method of using the dynamic storage device as claimed in claim 1, comprising the steps of:

(Step 1) receiving, by the at least one gate, a carrier group created through an object collection process;

(Step 2) detecting, by the gate detection device, a quantity of carriers contained in the carrier group disposed at the at least one gate and sending, by the gate detection device, to the central control system, and comparing the quantity of carriers with the predetermined value determined by the central control system;

(Step 3) instructing, by the central control system, the power transmission device to move the carrier group disposed at the at least one gate to the at least one temporary storage area if the quantity of carriers is less than the predetermined value;

instructing, by the central control system, the power transmission device and the plurality of power carrying and moving devices to send the carrier group disposed at the gate to a specified empty storage location if the quantity of carriers is equal to the predetermined value; and issuing, by the central control system, a warning message to instruct the power transmission device, and the plurality of power carrying and moving devices not to operate until extra carriers are removed if the quantity of carriers is greater than the predetermined value; and (Step 4) sending and recording, by the carrier detection device, tag information of each carrier in the carrier group to the central control system that corresponds to the empty storage location after the storage location receives the carrier group from the gate.

3. The dynamic storage device as claimed in claim 1, wherein the plurality of power carrying and moving devices and the power transmission device are power roller conveyors.

4. An object retrieval method using the dynamic storage device as claimed in claim 3, comprising:
(Step 1) searching, by the central control system, tag information of each carrier of the at least one storage area that corresponds to an object retrieval condition contained in an object retrieval instruction;
(Step 2) specifying, by the central control system, a storage location of a carrier group matched with the object retrieval condition;
(Step 3) controlling, by the central control system, the power transmission device and the plurality of power carrying and moving devices to take out a carrier group from the specified storage location, wherein the central control system automatically deletes the tag information of the carriers in the at least one storage location when the carrier group leaves its storage location;
(Step 4) controlling, by the central control system, the power transmission device to send a carrier group taken out from the at least one storage location to the at least one gate; or controlling the plurality of power transmission devices to take out one or more carriers matched with the object retrieval condition from the carrier group using an object retriever;
(Step 5) instructing, by the central control system, the power transmission device to move any remaining carriers that are not matched with an object retrieval condition to the temporary storage area; and
(Step 6) receiving, by the temporary storage area, the remaining unmatched carriers from the at least one gate, the at least one temporary storage detection device detecting whether or not a carrier group is present, the quantity of carriers of the carrier group, and tag information of the carriers in the carrier group, and sends the detection results to the central control system.

5. A temporary storage area management method using the storage device as claimed in claim 3, comprising the steps of:
(Step 1) randomly selecting a carrier in the temporary storage area, and stacking the carriers to a predetermined number to form a carrier group;

(Step 2) instructing, by the central control system, the carrier group to be moved from the temporary storage location to the at least one gate, and deleting the tag information of the carriers in the carrier group that have left the at least one temporary storage area;
the gate detection device detects the quantity of carriers contained in the carrier group that came from the at least one temporary storage area to the central control system, and the central control system compares the detected quantity of carriers with the predetermined value;
(Step 3) instructing, by the central control system, the power transmission device to return the carrier group disposed at the at least one gate to the at least one temporary storage area if the quantity of carriers is less than the predetermined value;
instructing, by the central control system, the power transmission device and the plurality of power carrying and moving devices to move the carrier group disposed at the at least one gate to an empty storage location that has been specified by the central control system if the quantity of carriers is equal to the predetermined value; and
issuing, by the central control system, a warning message to instruct the plurality of power carrying and moving devices and the power transmission device not to operate until extra carriers are removed if the quantity of carriers is greater than the predetermined value; and
(Step 4) recording, by the carrier detection device, tag information of each carrier in the carrier group in the empty storage location, and sending the results to the central control system, after the storage location receives the carrier group from the temporary storage area.

6. A dynamic storage device, comprising:
a central control system;
at least one storage area, having a predetermined number of storage locations, and the storage location being recorded by the central control system; each storage location being capable of randomly placing a carrier group; the carrier group being formed by a predetermined number of randomly stacked carriers; the carrier carrying an object; each carrier being attached with a (Radio Frequency Identification (RFID) tag, and the RFID tag having tag information that can be read and written repeatedly; the tag information being object data recorded in the carrier;
a carrier detection device, installed in the storage area, for sending a detection result of each storage location with or without a carrier group, and reading and sending each tag information of the carrier group to the central control system; the central control system recording the tag information of each carrier group according to the storage location;
a power transmission device, the central control system controlling the power transmission device to displace to place the carrier group into a storage location specified by the central control system or remove the carrier group from the storage location specified by the central control system;
at least one gate, adjacent to the storage area; the carrier group removed from the storage area or to be entered into the storage area being disposed at the gate; the gate having a gate detection device for sending the gate with or without the carrier group, the quantity of carriers contained in the carrier group, and each tag information of the carrier group to the central control system; and at least one temporary storage area, communicating to the gate, for receiving the carrier group coming from the gate and having a quantity of carriers less than the predetermined value; the temporary storage area having a temporary storage detection device installed therein and provided for sending the temporary storage area with or without the carrier group, the quantity of carriers of the carrier group, and each tag information of the carrier group to the central control system.

7. The dynamic storage device as claimed in claim 6, wherein the power transmission device is a crane.

8. A dynamic access management method using the dynamic storage device as claimed in claim 6, comprising:
- (Step 1) receiving, by the at least one gate, a carrier group created through an object collection process;
- (Step 2) detecting and sending, by the gate detection device, a quantity of carriers contained in the carrier group disposed at the at least one gate to the central control system, and comparing the quantity of carriers with the predetermined value determined by the central control system;
- (Step 3) instructing, by the central control system, the power transmission device to move the carrier group disposed at the at least one gate to the at least one temporary storage area if the quantity of carriers is less than the predetermined value; instructing, by the central control system, the power transmission device to send the carrier group disposed at the gate to a specified empty storage location if the quantity of carriers is equal to the predetermined value; and
- issuing, by the central control system, a warning message to instruct the power carrying and moving device, and the power transmission device not to operate until extra carriers are removed if the quantity of carriers is greater than the predetermined value; and
- (Step 4) sending and recording, by the carrier detection device, tag information of each carrier in the carrier group to the central control system that corresponds to the empty storage location after the storage location receives the carrier group from the gate.

9. An object retrieval method of using the dynamic storage device access management method as claimed in claim 6, comprising the steps of:
- (Step 1) searching, by the central control system, tag information of each carrier of the at least one storage area that corresponds to an object retrieval condition contained in an object retrieval instruction;
- (Step 2) specifying, by the central control system, a storage location of a carrier group matched with the object retrieval condition;
- (Step 3) controlling, by the central control system, the power transmission device, to take out a carrier group from the specified storage location, wherein the central control system automatically deletes the tag information of the carriers in the at least one storage location when the carrier group leaves its storage location;
- (Step 4) controlling, by the central control system, the power transmission device to send a carrier group taken out from the at least one storage location to the at least one gate; or controlling the power transmission device to take out one or more carriers matched with the object retrieval condition from the carrier group using an object retriever;
- (Step 5) instructing, by the central control system, the power transmission device to move any remaining carriers that are not matched with an object retrieval condition to the temporary storage area; and
- (Step 6) receiving, by the temporary storage area, the remaining unmatched carriers from the at least one gate, the at least one temporary storage detection device detecting whether or not a carrier group is present, the quantity of carriers of the carrier group, and tag information of the carriers in the carrier group, and sends the detection results to the central control system.

10. A temporary storage area management method of using the dynamic storage device as claimed in claim 6, comprising:
- (Step 1) randomly selecting a carrier in the temporary storage area, and stacking the carriers to a predetermined number to form a carrier group;
- (Step 2) instructing, by the central control system, the carrier group to be moved from the temporary storage location to the at least one gate, and deleting the tag information of the carriers in the carrier group that have left the at least one temporary storage area;
- the gate detection device detects the quantity of carriers contained in the carrier group that came from the at least one temporary storage area to the central control system, and the central control system compares the detected quantity of carriers with the predetermined value;
- (Step 3) instructing, by the central control system, the power transmission device to return the carrier group disposed at the at least one gate to the at least one temporary storage area if the quantity of carriers is less than the predetermined value;
- instructing, by the central control system, the power transmission device to move the carrier group disposed at the at least one gate to an empty storage location that has been specified by the central control system if the quantity of carriers is equal to the predetermined value; and
- issuing, by the central control system, a warning message to instruct the power transmission device not to operate until extra carriers are removed if the quantity of carriers is greater than the predetermined value; and
- (Step 4) recording, by the carrier detection device, tag information of each carrier in the carrier group in the empty storage location, and sending the results to the central control system, after the storage location receives the carrier group from the temporary storage area.

* * * * *